Oct. 28, 1969     J. S. GALLO     3,474,568
CUT FLOWER ENCASING SHEATH
Filed Aug. 22, 1967

INVENTOR.
Joseph Saketo Gallo
BY
Maxwell Field
ATTORNEY

United States Patent Office 3,474,568
Patented Oct. 28, 1969

3,474,568
CUT FLOWER ENCASING SHEATH
Joseph Sabeto Gallo, 58 Peach St.,
Walpole, Mass. 02081
Filed Aug. 22, 1967, Ser. No. 662,512
Int. Cl. A01g 5/00
U.S. Cl. 47—55                              3 Claims

ABSTRACT OF THE DISCLOSURE

The disclosure of the invention is a cut flower stem encasing sheath for supporting and retaining a flower stem thrust into a supporting body of foam or like material, which comprises a long narrow strip of a stiff, bendable, preferably metallic material having a laterally concaved surface contour, said strip being tapered from each end to form a narrow waist at a point midway of the two ends for folding at said midway point to form a sheath at least partially enveloping a said stem, while permitting moisture to pass freely between said folded strip portions to said stem, and having outwardly projecting sharp edge protuberances at each side of said midway point for engagement with said supporting body of foam or like material, and additional inwardly projecting sharp edge protuberances toward the ends of said strip for engagement with said enclosed stem.

---

The present invention relates to a cut flower stem encasing sheath for supporting and retaining a flower stem thrust into a supporting body of foam or like material.

It is the object of the invention to provide an inexpensive and readily applied sheath for the stems of cut flowers which will permit the sheathed stem to be thrust firmly into a bed of foam or like material, will provide an adequate support for the stem in the foam, and will prevent the flower stem and sheath from being inadvertently dislodged or withdrawn from the foam.

With the above and other objects in view as may hereinafter appear the several features of the invention will be readily apparent to one skilled in the art from the following description taken in connection with the accompanying drawing, in which.

Figure 1:
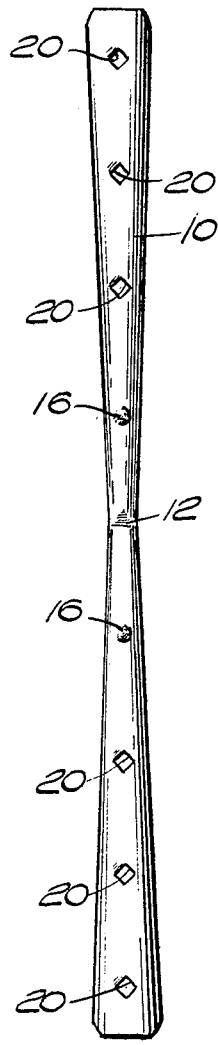
FIG. 1 is a face view of an opened out sheath for supporting and retaining the stem of a cut flower in the body of foam or like material.
Figure 2:
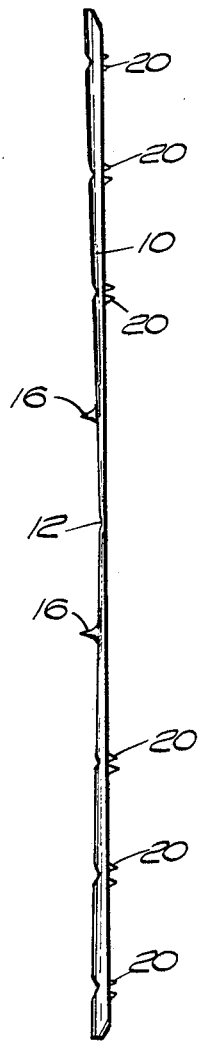
FIG. 2 is a side view of the opened out sheath shown in FIG. 1.
Figure 3:
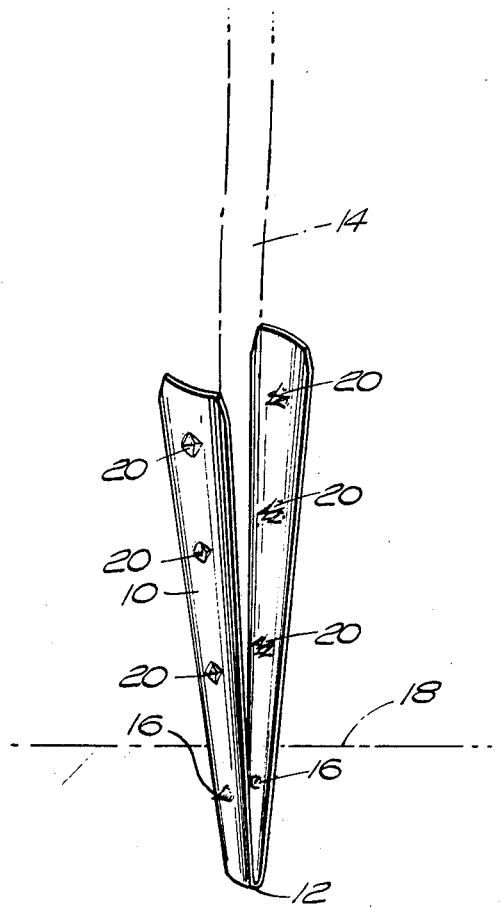
FIG. 3 is a perspective view of the sheath folded over to receive the cut flower stem, and partially embedded in the foam as indicated by the dot-and-dash lines.

Referring to the drawing, my cut flower stem enclosing sheath consists of a long narrow strip of thin metal 10 having a laterally concaved surface contour, said strip being tapered from each end to form a narrow waist 12 at a point midway of the two ends for folding at said midway point to form the sheath shown in FIG. 3, adapted to be fitted over the end of a flower stem 14, as indicated in dot-and-dash lines. At each side of the midway point an outwardly projecting sharp edge protuberance 16 is formed in the metallic strip 10 to be engaged with and to hold the sheathed flower stem 14 firmly in the foam 18 into which it is thrust. Toward each end of the metallic strip 10 a series of additional inwardly projecting sharp edge protuberances 20 are provided for engagement with the enclosed flower stem. In the preferred form of the invention shown the protuberances are formed in the metallic strip 10 by means of a punch, and appear as sharp edged fragments which project outwardly or inwardly from the surface of the strip 10.

The cut flower stem encasing sheath herein described has the advantage that it is simple in construction, is readily assembled with a cut flower stem, and acts when the sheathed stem is thrust into a foam material to hold the stem in the sheath and at the same time to secure the sheathed stem against slipping out of the foam. The wedge shaped edge of the folded over sheath is adapted to enter the foam material with a minimum displacement of the foam, which becomes engaged with the outwardly projecting protuberances 16, while the inward protuberances are engaged with the stem, causing the sheathed stem to be retained firmly in the foam. It will be noted also that the folded over construction of the sheath, which leaves the side edges relatively open, provides complete freedom of access for any moisture stored in the foam to the end of the cut flower stem thus ensuring a maximum life for the bloom.

The invention having been described what is claimed is:

1. A cut flower stem encasing sheath for supporting a flower stem thrust into a supporting body of foam or like material, which comprises a long narrow strip of a stiff, bendable water resistant material having a laterally concaved surface contour and adapted to be folded at a point midway of the two ends to form a sheath at least partially enveloping a said stem while permitting moisture to pass freely between said folded strip portions to said stem, said strip having at each side of said midway point outwardly projecting sharp edge protuberances for engagement with said supporting body of foam or like material, and additional inwardly projecting sharp edge protuberances for engagement with said enclosed material.

2. The combination of claim 1, in which said strip is tapered from each end to said midway point forming a narrow waist.

3. The combination of claim 2, in which said strip is formed of a soft metal.

References Cited

UNITED STATES PATENTS

| 2,046,854 | 7/1936 | Simpson | 47—41.13 |
| 2,249,567 | 7/1941 | Reichelt | 47—55 |
| 2,486,109 | 10/1949 | Brutocao et al. | 47—55 |
| 2,641,086 | 6/1953 | Shinoda | 47—55 |

FOREIGN PATENTS 1,169,932  1/1959  France.

ROBERT E. BAGWILL, Primary Examiner

U.S. Cl. X.R.
47—41.12; 248—27.8, 38